July 31, 1951 — H. M. KESTERTON — 2,562,466
TRANSVERSELY ENGAGED CLUTCH
Filed July 26, 1946

Inventor
H M Kesterton

Patented July 31, 1951

2,562,466

UNITED STATES PATENT OFFICE 2,562,466

TRANSVERSELY ENGAGED CLUTCH

Henry Martin Kesterton, Wroxall, near Warwick, England

Application July 26, 1946, Serial No. 686,394
In Great Britain August 7, 1945

3 Claims. (Cl. 192—77)

This invention has for its object to provide improved friction clutches of simple construction for interconnecting a pair of coaxial (driving and driven) members, or serving to effect the synchro-meshing of gear wheels.

Figure 2:
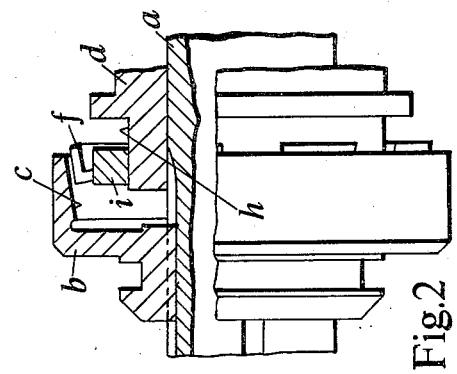
Figure 1:
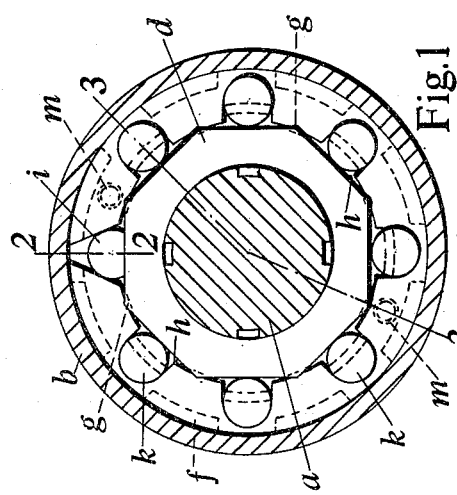
Figure 3:
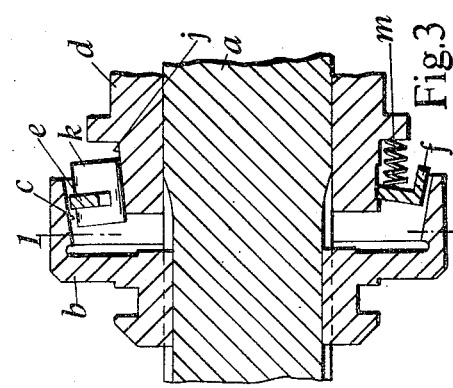

In the accompanying drawings, Figure 1 is a sectional end view of a friction clutch embodying the invention for interengaging a pair of coaxial (driving and driven) members. Figure 2 is a part sectional elevation on the line 2—2 Figure 1, the latter being a section on the line 1—1 Figure 3. Figure 3 is a sectional elevation on the line 3—3, Figure 1.

Figure 5:
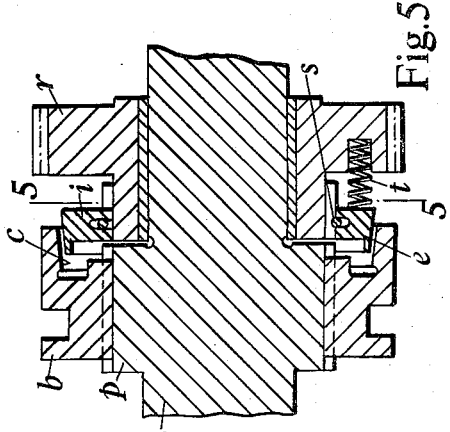
Figure 4:
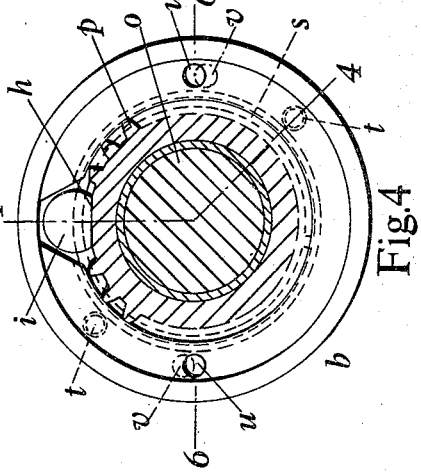
Figure 6:
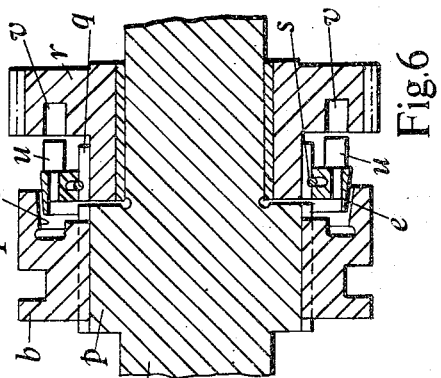

Figure 4 is a sectional end view of a friction clutch embodying the invention and adapted to serve as a synchro-meshing device between a pair of coaxial (driving and driven) members. Figure 5 is a sectional elevation on the line 4—4, Figure 4, the latter being a section on the line 5—5, Figure 5. Figure 6 is a sectional plan on the line 6—6, Figure 4.

Referring to Figures 1-3, I mount in spline connection with a driving shaft $a$, a hollow member $b$ having a truncated conical inner periphery $c$. On the same shaft I rotatably but non-slidably mount the driven member $d$ which at one end is adapted to lie within the first member. On the part of the member $d$ which enters the member $b$ I mount a split expansible friction ring. In one convenient form this comprises a flat web portion $e$ and a peripheral flange $f$ extending from one side of the web portion, the outer periphery of the flange $f$ being made to correspond in shape to the inner periphery $c$ of the first member $b$. The web $e$ is sprung into a shallow circumferential groove $g$ in the member $d$. Also on the member $d$ is formed a flat $h$ which is parallel with the axis of the shaft, and on the flat is freely supported a wedging piece $i$ which lies between the oppositely inclined adjacent ends of the ring $e$, $f$. This wedging piece may have (as shown) a flat surface which sits on the flat $h$ of the member $d$, and a semi-cylindrical surface which lies in contact with the said ends of the ring.

The arrangement is such that when the member $b$ is slid into contact with the ring $e$, $f$, the latter and therefore the wedging piece is given thereby a small angular movement relatively to the member $d$ and the consequent interaction of the wedging piece $i$ with the ends of the ring causes the latter to be expanded into tight frictional engagement with the member $b$. Release of the clutch is effected by sliding the member $b$ out of engagement with the ring.

A clutch as above described is of simple construction and is suitable for dealing with relatively light loads. But when it is required to be able to transmit heavier loads, I arrange for the action of the ring $e$, $f$ to be supplimented by additional wedging means. In one convenient construction, as shown, I form around the part of the member $d$ which enters the first member, a series of polygonal surfaces $j$ (in addition to the flat $h$ above mentioned) which surfaces $j$ are tapered in a manner corresponding with the inner periphery of the member $b$, and on each such surface $j$ I mount a roller $k$ which can effect a driving connection between the two members $b$, $d$. The ring $e$, $f$ in this case, in addition to serving the purpose above mentioned, serves also as a cage for holding the rollers $k$ in position. Thus the flange $f$ of the ring is gapped to allow the rollers to make contact with the member $a$ and each roller is formed with a transverse slot to receive the web $e$ of the ring. Also the above mentioned groove $g$ in the member $d$ into which the web $e$ of the ring is sprung is made wide enough to allow sufficient axial freedom of the ring and rollers. When the clutch is brought into action, not only is the ring expanded as above described, but the rollers are also caused to effect a wedging action between the members $b$, $d$. In addition I preferably arrange between one side of the ring $e$, $f$ and a shoulder on the member $d$ a pair of springs $m$ which serve to press the ring toward the member $b$.

In the application of the invention as shown in Figures 4-6 to a synchro-meshing device for facilitating the interconnection of a pair of gear wheels, I employ a shaft $o$ on which is formed or secured a gear wheel $p$, and rotatably but non-slidably mounted on this shaft is another gear wheel $q$. In this example the wheel $q$ forms one of a pair of gear wheels $q$, $r$. On the wheel $p$ is slidably mounted a hollow member $b$ having a truncated conical inner periphery $c$, and having also internal teeth meshing with the teeth of the wheel $p$. On the wheel $q$ is mounted a split expansible friction ring $e$ having a tapered outer periphery which is complementary to the peripheral surface $c$ in the member $b$. The ring $e$ is held against accidental axial displacement relatively to the wheel $q$ by a split wire ring $s$ which occupies a deep groove in the ring $e$ and a shallow groove in the wheel $q$. Also on the wheel $q$ is formed a flat $h$ which carries a wedging piece $i$, the latter lying between the oppositely inclined adjacent ends of the ring $e$. The ring $e$ is interconnected with the wheel $q$ by one or more springs $t$ adapted to exert both axial pressure and torsional constraint on the ring $e$. Further I may provide on the ring $e$ one or more baulking pins $u$ adapted to enter holes $v$ in the wheel $q$ when the teeth of the wheels $p$, $q$ are brought into alignment.

The arrangement is such that when it is required to interconnect the wheels $p$, $q$ while one or both are rotating, the member $b$ is moved axially into contact with the ring $e$, and the consequent angular movement given to the ring $e$ relatively to the wheel $q$, causes the ring $e$ to expand (under the action of the wedging piece $i$) thus clutching the parts $b$ and $q$ together and causing them to rotate at the same speed. The angular displacement of the ring $e$ on the wheel $q$ carries the baulking pins $u$ out of line with the holes $v$ and so prevents sliding of the member $b$ into engagement with the wheel $q$ until the speeds are equalised. When equality of speed is attained the action of the springs $t$ on the ring $e$ bring the pegs $u$ into line with the holes $v$ and so allow the members $b$ and ring $e$ to slide for effecting engagement of the teeth of the member $b$ with the teeth of the wheel $q$. In this continued sliding movement of the member $b$ and ring $e$, the spring ring $s$ is moved out of the shallow groove in the wheel $q$ and caused to slide across the tips of the teeth of the wheel $q$, re-engagement with the groove being effected when the parts are returned to the initial position shown in the drawings.

The invention is not, however, restricted to the examples described as subordinate details may be modified to suit different requirements. Also instead of arranging the member $b$ to slide, this may be fixed on its shaft, and the sliding movement is then imparted to the other member. Further either member may be used as the driving member. Also the ring $e$ may be mounted on the member $b$, the internal cone being then formed on the adjacent member as $d$ or $r$.

Having thus described my invention what I claim as new and desire to secure by Letters Patent is:

1. A friction clutch comprising the combination of a hollow member having a truncated conical inner periphery, a second member arranged coaxially with the first mentioned member, a split expansible friction ring mounted on the second member and having a truncated conical outer peripheral surface for co-operating with the inner periphery of the first member, the said members being relatively slidable in an axial direction to move the friction ring into and out of a position in which its outer peripheral surface is in contact with the truncated conical inner periphery of the first member, and a wedging piece situated between and located by the adjacent ends of the friction ring on a part of the second member whereby the wedging piece is loosely supported so that relative angular movement of the second member and wedging piece causes the wedging piece to expand the ring into frictional engagement with the first member, and thereby effect a driving connection between the first and second members, when the said members occupy appropriate axial positions with respect to each other.

2. A friction clutch comprising the combination of a hollow member having a truncated conical inner periphery, a second member arranged coaxially with the first mentioned member, the two members being relatively slidable, a split expansible friction ring mounted on the second member and having a truncated conical outer peripheral surface for co-operating with the inner periphery of the first member, a wedging piece situated between and located by the adjacent ends of the friction ring on a part of the second member whereby the wedging piece is loosely supported so that relative angular movement of the second member and wedging piece causes the wedging piece to expand the ring into frictional engagement with the first member, and thereby effect a driving connection between the first and second members, when the said members occupy appropriate axial positions with respect to each other, and a plurality of rollers for supplementing the driving connection between the first and second members, the second member being formed with a plurality of flat parts with which and the inner periphery of the first member the rollers co-operate.

3. A friction clutch comprising the combination of a hollow member having a truncated conical inner periphery, a second member arranged coaxially with the first mentioned member, the two members being relatively slidable, a split expansible friction ring mounted on the second member and having a truncated conical outer peripheral surface for co-operating with the inner periphery of the first member, and a wedging piece situated between and located by the adjacent ends of the friction ring on a part of the second member whereby the wedging piece is loosely supported so that relative angular movement of the second member and wedging piece causes the wedging piece to expand the ring into frictional engagement with the first member, and thereby effect a driving connection between the first and second members, when the said members occupy appropriate axial positions with respect to each other, and a plurality of rollers located by the expansible ring for supplementing the driving connection between the first and second members, the second member being formed with a plurality of flat parts with which and the inner periphery of the first member the rollers co-operate.

HENRY MARTIN KESTERTON.

REFERENCES CITED

The following references are of record in the file of this patent:

UNITED STATES PATENTS

| Number | Name | Date |
| --- | --- | --- |
| 1,257,718 | Lott | Feb. 26, 1918 |
| 1,293,053 | Donnelly | Feb. 4, 1919 |
| 1,475,564 | Colliau | Nov. 27, 1923 |
| 1,479,479 | Osswald | Jan. 1, 1924 |
| 1,511,776 | Roberts | Oct. 14, 1924 |
| 1,751,809 | Glisch | Mar. 25, 1930 |
| 2,113,512 | Kesterton | Apr. 5, 1938 |
| 2,144,674 | Campbell | Jan. 24, 1939 |
| 2,497,361 | Kesterton | Feb. 14, 1950 |